United States Patent
Mizukami et al.

(10) Patent No.: US 11,209,884 B2
(45) Date of Patent: Dec. 28, 2021

(54) INFORMATION PROCESSING APPARATUS, INFORMATION PROCESSING METHOD, AND PROGRAM

(71) Applicants: Sony Mobile Communications Inc., Tokyo (JP); Sony Corporation, Tokyo (JP)

(72) Inventors: Tomoo Mizukami, Tokyo (JP); Noriaki Sakamoto, Tokyo (JP); Tomonobu Tsujikawa, Tokyo (JP); Shota Kawarazaki, Tokyo (JP); Ryo Nakagawa, Tokyo (JP); Yoshiyuki Kobayashi, Tokyo (JP)

(73) Assignees: SONY MOBILE COMMUNICATIONS INC., Tokyo (JP); SONY CORPORATION, Tokyo (JP)

( * ) Notice: Subject to any disclaimer, the term of this patent is extended or adjusted under 35 U.S.C. 154(b) by 76 days.

(21) Appl. No.: 16/485,169

(22) PCT Filed: Dec. 28, 2017

(86) PCT No.: PCT/JP2017/047154
§ 371 (c)(1),
(2) Date: Aug. 12, 2019

(87) PCT Pub. No.: WO2018/154970
PCT Pub. Date: Aug. 30, 2018

(65) Prior Publication Data
US 2020/0042064 A1 Feb. 6, 2020

(30) Foreign Application Priority Data
Feb. 24, 2017 (JP) .............................. JP2017-034158

(51) Int. Cl.
G06F 1/28 (2006.01)
G06F 1/3212 (2019.01)
H02J 7/00 (2006.01)

(52) U.S. Cl.
CPC .............. *G06F 1/28* (2013.01); *G06F 1/3212* (2013.01); *H02J 7/00* (2013.01); *H02J 7/0047* (2013.01); *Y02D 10/00* (2018.01)

(58) Field of Classification Search
CPC .. G06F 1/28; G06F 1/3212; H02J 7/00; H02J 7/0047; Y02D 10/00
See application file for complete search history.

(56) References Cited

U.S. PATENT DOCUMENTS

2012/0169608 A1 7/2012 Forutanpour et al.
2012/0254634 A1 10/2012 Chakra et al.
(Continued)

FOREIGN PATENT DOCUMENTS

EP 2 915 021 A2 9/2015
JP 2000-214238 A 8/2000
(Continued)

OTHER PUBLICATIONS

International Search Report and Written Opinion dated Mar. 6, 2018 for PCT/JP2017/047154 filed on Dec. 28, 2017, 8 pages including English Translation of the International Search Report.
(Continued)

*Primary Examiner* — Terrell S Johnson
(74) *Attorney, Agent, or Firm* — Xsensus LLP (57) ABSTRACT

The present disclosure provides novel and improved information processing apparatus, information processing method, and program with which it is easy for a user to predict a future remaining battery amount. According to the present disclosure, there is provided an information processing apparatus including a control unit that performs control
(Continued)

to calculate a future prediction value of remaining battery amount on the basis of a use history of an information processing apparatus by a user and to present prediction value related information related to the prediction value to the user. According to the present disclosure, the user can easily predict the Future remaining battery amount. Note that the effects described above are not necessarily limitative. With or in the place of the above effects, there may be achieved any one of the effects described in this specification or other effects that may be grasped from this specification.

19 Claims, 6 Drawing Sheets

(56) References Cited

U.S. PATENT DOCUMENTS

| | | | | |
|---|---|---|---|---|
| 2015/0084778 A1* | 3/2015 | Mittal | ............... | G06F 1/3287 340/636.16 |
| 2015/0145483 A1 | 5/2015 | Shinohara et al. | | |
| 2016/0073351 A1* | 3/2016 | Cardozo | ............... | G06F 1/28 455/574 |
| 2016/0266211 A1* | 9/2016 | Imaizumi | ............ | G01R 31/392 |
| 2016/0357654 A1 | 12/2016 | de la Cropte de Chanterac et al. | | |
| 2017/0371394 A1* | 12/2017 | Chan | ............... | G06F 1/3218 |
| 2018/0080992 A1* | 3/2018 | Kadirvel | ......... | G01R 31/3842 |
| 2018/0204393 A1* | 7/2018 | Landolsi | ............. | F02M 35/021 |
| 2020/0042064 A1* | 2/2020 | Mizukami | ............... | G06F 1/28 |

FOREIGN PATENT DOCUMENTS

| | | |
|---|---|---|
| JP | 2009-017621 A | 1/2009 |
| JP | 2013-121266 A | 6/2013 |
| JP | 2014-508434 A | 4/2014 |
| JP | 2015-104213 A | 6/2015 |
| WO | 2014/066678 A2 | 5/2014 |
| WO | 2014/066678 A3 | 5/2014 |
| WO | WO-2014066678 A2 * | 5/2014 ........ H04W 52/0258 |

OTHER PUBLICATIONS

Extended Search Report issued in European Application 17897779.9-1221 dated Dec. 18, 2019.

* cited by examiner

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2017/047154, filed Dec. 28, 2017, which claims priority to JP 2017-034158, filed Feb. 24, 2017, the entire contents of each are incorporated herein by reference.

TECHNICAL FIELD

The present disclosure relates to an information processing apparatus, an information processing method, and a program.

BACKGROUND ART

Patent Document 1 discloses a technology of turning off electronic equipment in a case where the remaining battery amount falls below a predetermined value. In this technology, after the electronic equipment is turned off, in a case where the electronic equipment is connected to a charger, cold boot is executed.

CITATION LIST

Patent Document

Patent Document 1: Japanese Patent Application Laid-Open No. 2013-121266

SUMMARY OF THE INVENTION

Problems to be Solved by the Invention

However, the technology disclosed in Patent Document 1 does not present any future prediction value of remaining battery amount. Therefore, it is not easy for a user to predict a future remaining battery amount.

Thus, the present disclosure provides novel and improved information processing apparatus, information processing method, and program with which it is easy for a user to predict a future remaining battery amount.

Solutions to Problems

According to the present disclosure, there is provided an information processing apparatus including a control unit that performs control to calculate a future prediction value of remaining battery amount on the basis of a use history of an information processing apparatus by a user and to present prediction value related information related to the future prediction value to the user.

According to the present disclosure, there is provided an information processing method in which a control unit performs control to calculate a future prediction value on the basis of a use history of an information processing apparatus by a user and to present prediction value related information related to the future prediction value to the user.

According to the present disclosure, there is provided a program causing a computer to achieve a control function that performs control to calculate a future prediction value on the basis of a use history of an information processing apparatus by a user and to present prediction value related information related to the future prediction value to the user.

Effects of the Invention

As described above, according to the present disclosure, a future prediction value of remaining battery amount is calculated on the basis of a use history of an information processing apparatus by a user and prediction value related information related to the prediction value is presented to the user. Accordingly, the user can easily predict the future remaining battery amount. Note that the effects described above are not necessarily limitative. With or in the place of the above effects, there may be achieved any one of the effects described in this specification or other effects that may be grasped from this specification.

MODE FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Configuration of the information processing apparatus
2. Processing by the information processing apparatus <1. Configuration of the Information Processing Apparatus>

Figure 1:
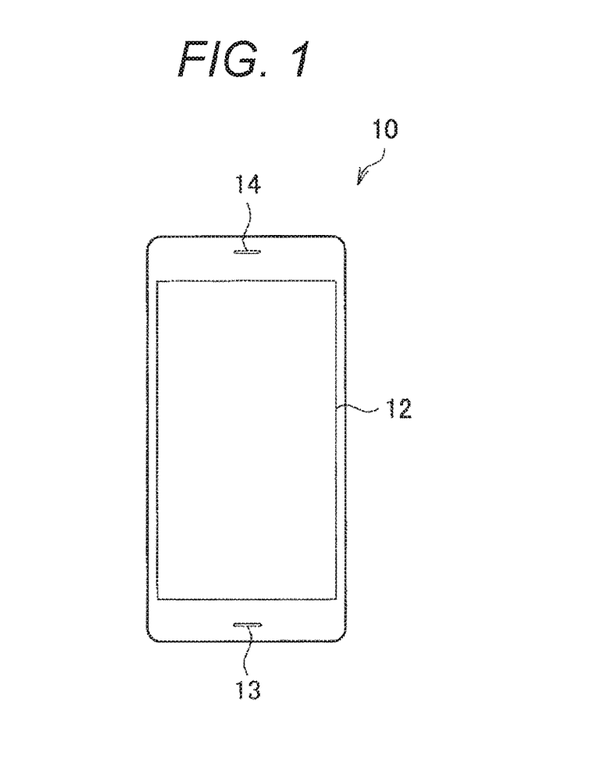
FIG. 1 is an explanatory view illustrating an external appearance of an information processing apparatus according to an embodiment of the present disclosure.
Figure 2:
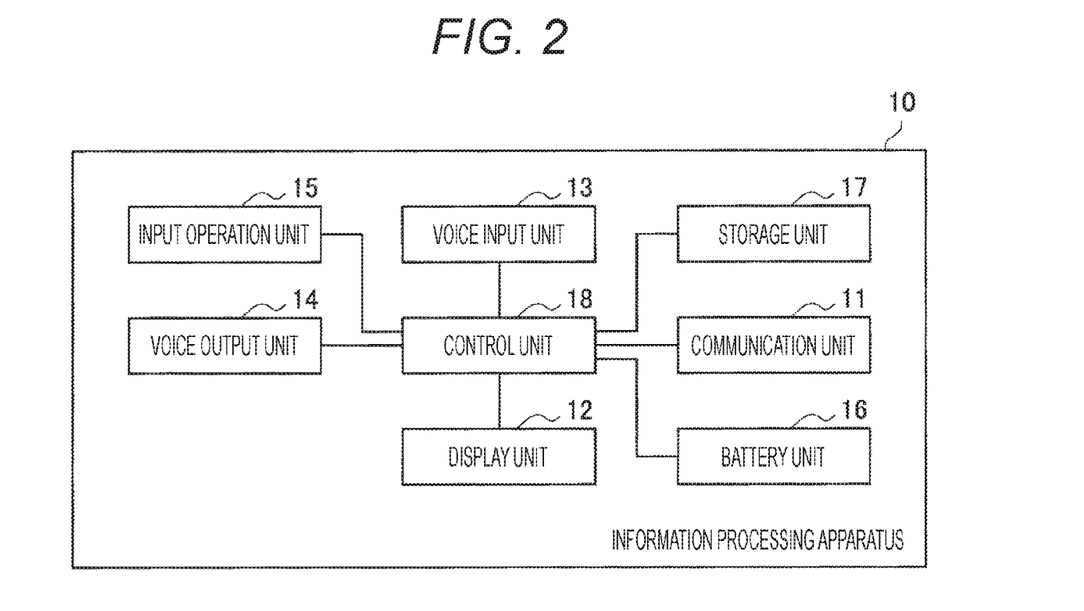
FIG. 2 is a functional block diagram of an information processing apparatus.

First, a configuration of an information processing apparatus 10 according to the present embodiment is described on the basis of FIGS. 1 and 2. The information processing apparatus 10 is so-called a smartphone. Of course, this is a mere example. The information processing apparatus 10 may be any information processing apparatus that is driven by a battery, for example, a portable phone, a smart tablet, a laptop personal computer, or the like.

The information processing apparatus 10 includes a communication unit 11, a display unit 12, a voice input unit 13, a voice output unit 14, an input operation unit 15, a battery unit 16, a storage unit 17, and a control unit 18. Constituent elements of the information processing apparatus 10 are not limited to the above, but may further include other constituent elements. For example, the information processing apparatus 10 may further include an imaging unit or the like. The information processing apparatus 10 includes a hardware configuration including a central processing unit (CPU), a read only memory (ROM), a random access memory (RAM), a nonvolatile memory, a communication apparatus, a display, a microphone, a speaker, a touch panel, various buttons, a battery, and the like. The ROM records information necessary for operation of the information processing apparatus 10, for example, a program. The CPU reads and executes a program recorded in the ROM. Thus, the communication unit 11, the display unit 12, the voice input unit 13, the voice output unit 14, the input operation unit 15, the battery unit 16, the storage unit 17, and the control unit 18 are achieved. In a case where the information processing apparatus 10 includes an imaging unit, the imaging unit is achieved by an imaging device (for example, a camera or the like).

The communication unit 11 includes, for example, a communication device or the like and communicates with another information processing apparatus or the like. A communication aspect includes, WiFi communication, mobile data communication, Bluetooth (registered trademark) communication or the like. Furthermore, the communication unit 11 also receives position information of the information processing apparatus 10. The position information includes, for example, information associated with altitude, latitude, and longitude of the information processing apparatus 10. The display unit 12 displays various images. The voice input unit 13 includes, for example, a microphone or the like, and takes in voices or the like uttered by a user of the information processing apparatus 10. The voice output unit 14 includes, for example, a speaker, and outputs various types of voice. The input operation unit 15 includes, for example, a touch panel, various buttons, and the like and accepts the user's input operation. The battery unit 16 includes, for example, a battery, and feeds electric power to the constituent elements of the information processing apparatus 10. Furthermore, the battery unit 16 detects a state of the battery (remaining battery amount, voltage, temperature, capacity, power consumption, or the like).

The storage unit 17 includes a ROM, a RAM, a nonvolatile memory or the like. The storage unit 17 stores one or more types of prediction history variables in addition to the aforementioned program. Here, the prediction history variable indicates a use history of the information processing apparatus 10 by the user. The prediction history variable is not particularly limited insofar as a use history of the information processing apparatus 10 by the user is indicated. The prediction history variable includes, for example, a time point, days of the week, a remaining battery amount, whether or not the battery is in charged state, voltage of the battery, a battery capacity, the power consumption of the battery, an application use situation, a WiFi connection situation, a mobile data communication connection situation, a Bluetooth connection situation, a communication amount in each communication aspect, position information of the information processing apparatus 10, on/off state of the display unit 12, brightness of the display unit 12, operation frequency of the input operation unit 15 (for example, the number of times of touches on the touch panel), a CPU use rate, and the like. The control unit 18 calculates a future prediction value of remaining battery amount on the basis of the prediction history information of the above. Details will be described later. Furthermore, because the prediction history variable includes information as to whether or not the battery is in a charged state, the control unit 18 can predict a charge start timing on the basis of the prediction history information.

Here, the position information is, for example, the aforementioned altitude, latitude, longitude, and the like. Each piece of position information may be associated with clustered information, i.e., context information. The contest information indicates a location derived from the position information (for example, home, around home, train, office, restaurant, and the like).

Figure 4:
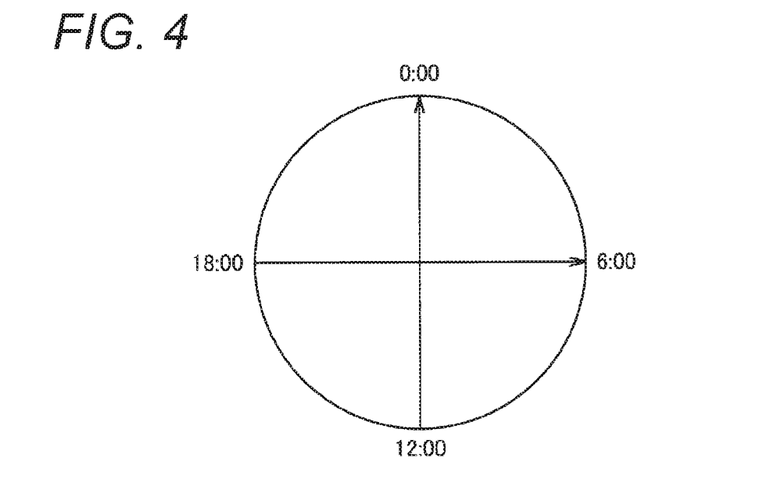
FIG. 4 is an explanatory view for explaining a prediction history variable used for similarity determination of a use history.
Figure 5:
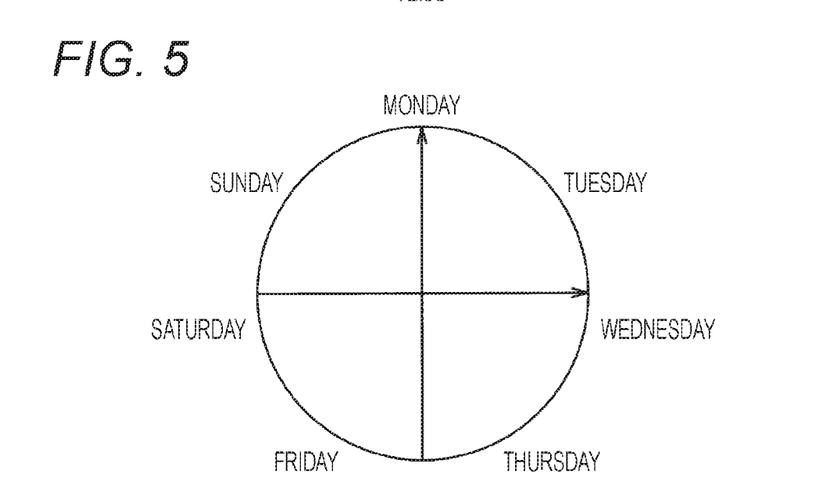
FIG. 5 is an explanatory view for explaining a prediction history variable used for similarity determination of a use history.

Note that the prediction history variable is quantified and recorded in the storage unit 17. For example, the time point and the days of the week may be recorded as two-dimensional information of $\sin \theta$ and $\cos \theta$. An example is illustrated in FIGS. 4 and 5. In FIG. 4, 0:00, 6:00, 12:00, and 18:00 correspond to 0°, 90°, 180°, and 240°, respectively. Accordingly, for example, 0:00 is recorded as $(\cos 0°, \sin 0°)$ $(=(0,1))$. Furthermore, 3:00 is recorded as $(\cos 45°, \sin 45°)$. Furthermore, in FIG. 5, Monday, Tuesday, Wednesday, Thursday, Friday, Saturday, and Sunday correspond to 0°, 45°, 90°, 135°, 180°, 225°, and 270°, respectively. Accordingly, for example, Monday is recorded as $(\cos 0°, \sin 0°)$ $(=(0,1))$. Furthermore, Tuesday is recorded as $(\cos 45°, \sin 45°)$. Of course, the method of recording the time point and the days of the week is not limited to the above.

Furthermore, regarding the context information, numerical values may be assigned with respect to each location. Regarding the communication connection situation, numerical values may be assigned at a plurality of stages in satisfactory order. Regarding the on/off state of the display unit 12, numerical values may be assigned with respect to each state.

Furthermore, the information indicated by a numerical value may become a prediction history variable as it is, but may be converted in some way. For example, regarding the latitude, longitude, and altitude, they may be indicated as a coordinate on a normalized three-dimensional space (for example, a coordinate in a cube space in which the length of one side is 1).

The number of types of the prediction history variable may be one or plural. However, in terms of evaluation of the use history from multiple points of view, the number of types of the prediction history variable is preferably plural.

The control unit 18 includes, for example, a CPU or the like, and generally controls the information processing apparatus 10. Moreover, the control unit 18 aggregates the prediction history variable every predetermined time (for example, every one minute) and records the prediction history variable in the storage unit 17. In other words, the control unit 18 records the use history of the information processing apparatus 10 by the user in the storage unit 17. Furthermore, the control unit 18 calculates a future prediction value of remaining battery amount on the basis of the use history of the information processing apparatus 10 by the user. Then, the control unit 18 performs control to present the prediction value related information related to the prediction value to the user. Details will be described later.

<2. Processing by the Information Processing Apparatus>

Figure 3:
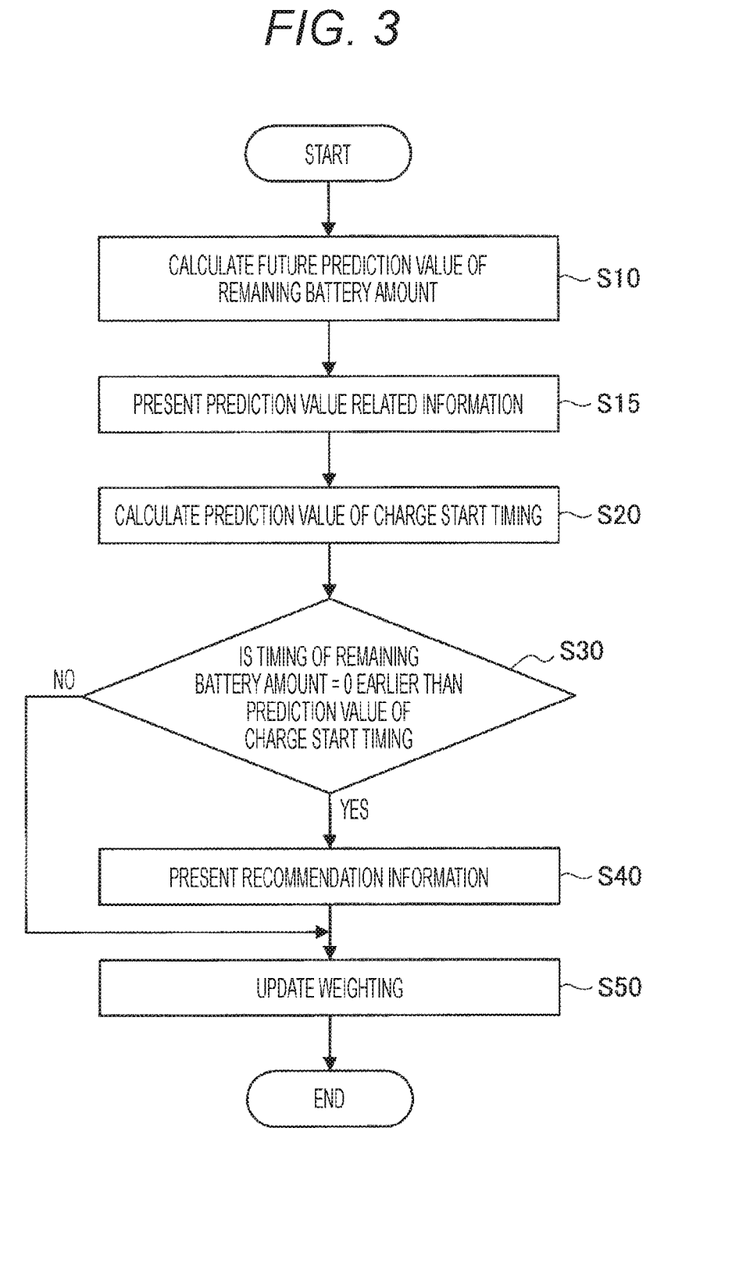
FIG. 3 is a flowchart illustrating a procedure of processing by an information processing apparatus.

Next, a procedure of processing by the information processing apparatus 10 is described along a flowchart illustrated in FIG. 3. In step S10, the control unit 18 calculates a future prediction value of remaining battery amount. Specifically, the processing described below is performed.

Figure 6:
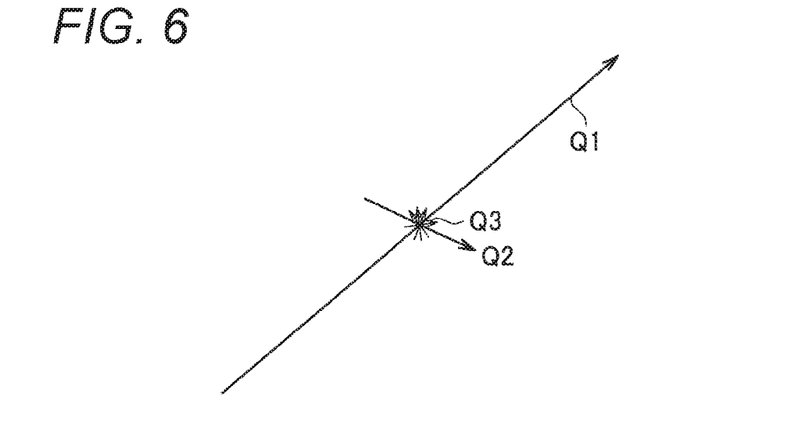
FIG. 6 is an explanatory view for explaining a virtual space used for similarity determination of a use history.

The control unit 18 first acquire the latest (i.e., newest) use history from the storage unit 17. Specifically, the control unit 18 acquires the latest prediction history variable from the storage unit 17. Then, the control unit 18 forms a virtual space for similarity judgment. Here, the virtual space is a multi-dimensional space having a variable axis corresponding to each prediction history variable. Here, the control unit 18 performs weighting on each prediction history variable in forming the virtual space. An initial value of weight is 1.0, and weighting is updated through a repetition of processing illustrated in FIG. 3. Thus, the accuracy of similarity judgment is increased. Note that the initial value of the weighting may be set on the basis of statistics of the use history by a plurality of users. FIG. 6 conceptually illustrates an example of the virtual space. Axis Q1 corresponds to the time point, axis Q2 corresponds to the days of the week, and axis Q3 corresponds to another prediction history variable. Note that, as described above, the time point and the time are two-dimensional information, but here are indicated as one-dimensional information for the sake of easy understanding. In the example of FIG. 6, the weighting on the time point is the largest, the weighting on the days of the week is the second largest following the time point, and the initial value remains for another prediction history variable. For example, in a case where the user uses the information processing apparatus 10 periodically at the same time point regardless of the days of the week, the control unit 18 may increase the weighting on the time point. Furthermore, in a case where the user uses the information processing apparatus 10 over a long period of time at a specific location (for example, train, home, or the like), the control unit 18 may increase the weighting on the context information.

Next, the control unit 18 searches for a similar use history similar to the latest use history from the use history of the information processing apparatus 10 by the user. Specifically, the control unit 18 sets the latest history vector corresponding to the latest prediction history variable in a virtual space for similarity judgment. Next, the control unit 18 sets a comparison history vector corresponding to the prediction history variable at each time point in a virtual space for similarity judgment. Then, the control unit 18 compares the latest history vector with the comparison history vector to determine their similarity. Specifically, for example, the control unit 18 may calculate an inner product of the vectors, and when the inner product is within a predetermined range, may determine that they are similar. In a case where they are similar, the comparison history vector is a similar use history. Here, the control unit 18 may take into account a situation (status) in performing similarity judgment. For example, in a case where the user performs a specific action (for example, shooting many photographs or the like) at a specific location (for example, resort), the control unit 18 may take into account such a situation in similarity judgment.

Next, the control unit 18 sets a remaining battery amount at each time point after the time point indicated by the similar use history to a future prediction value of remaining battery amount. Thus, the control unit 18 specifies the future prediction value of remaining battery amount. That is, the control unit 18 specifies the future prediction value of remaining battery amount every future time point. In other words, the control unit 18 calculates a prediction value curve indicating a future downward transition of remaining battery amount. Note that in a case where a plurality of similar use histories is present, the control unit 18 may perform the processing described below. In other words, the control unit 18 specifies the future prediction value of remaining battery amount for each similar use history. Next, the control unit 18 calculates an arithmetic mean value of the specified prediction value. Then, the control unit 18 sets the arithmetic mean value to the future prediction value.

Figure 7:
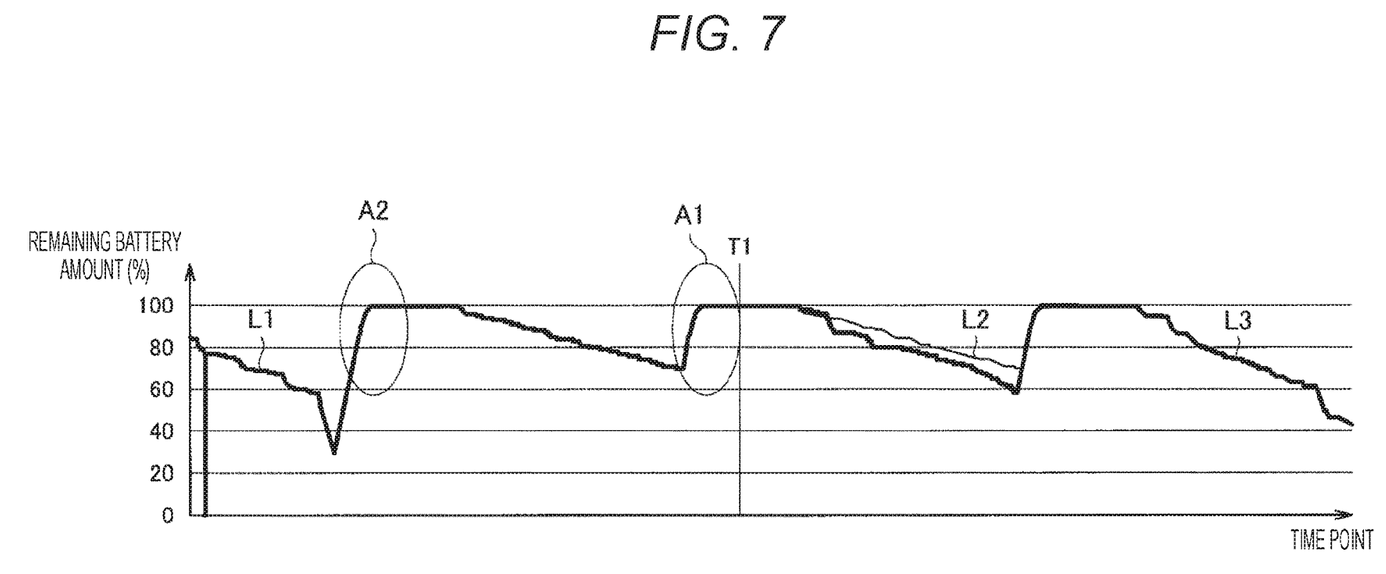
FIG. 7 is a graph for explaining a method for calculating a future prediction value of remaining battery amount.

Here, an example of calculation of the future prediction value is described on the basis of FIG. 7. In FIG. 7, the horizontal axis indicates time point and the vertical axis indicates a remaining battery amount (%). Time point T1 indicates current time point. Graph L1 is the history of remaining battery amount. The control unit 18 searches for a similar use history similar to the latest use history (use history in a region surrounded by frame A1). As a result, the control unit 18 determines that the use history in a region surrounded by frame A2 is the similar use history. Note that, although only the history of remaining battery amount is indicated in regions A1 and A2, as described above, similarity judgment is performed on the basis of various prediction history variables in practice. Then, the control unit 18 sets a remaining battery amount at each time point after the time point indicated by the similar use history to a future prediction value of remaining battery amount. Graph L2 indicates future prediction value. Note that graph L3 indicates a remaining battery amount actually measured in the future. In this example, it can be seen that graphs L2 and L3 are generally identical.

Figure 8:
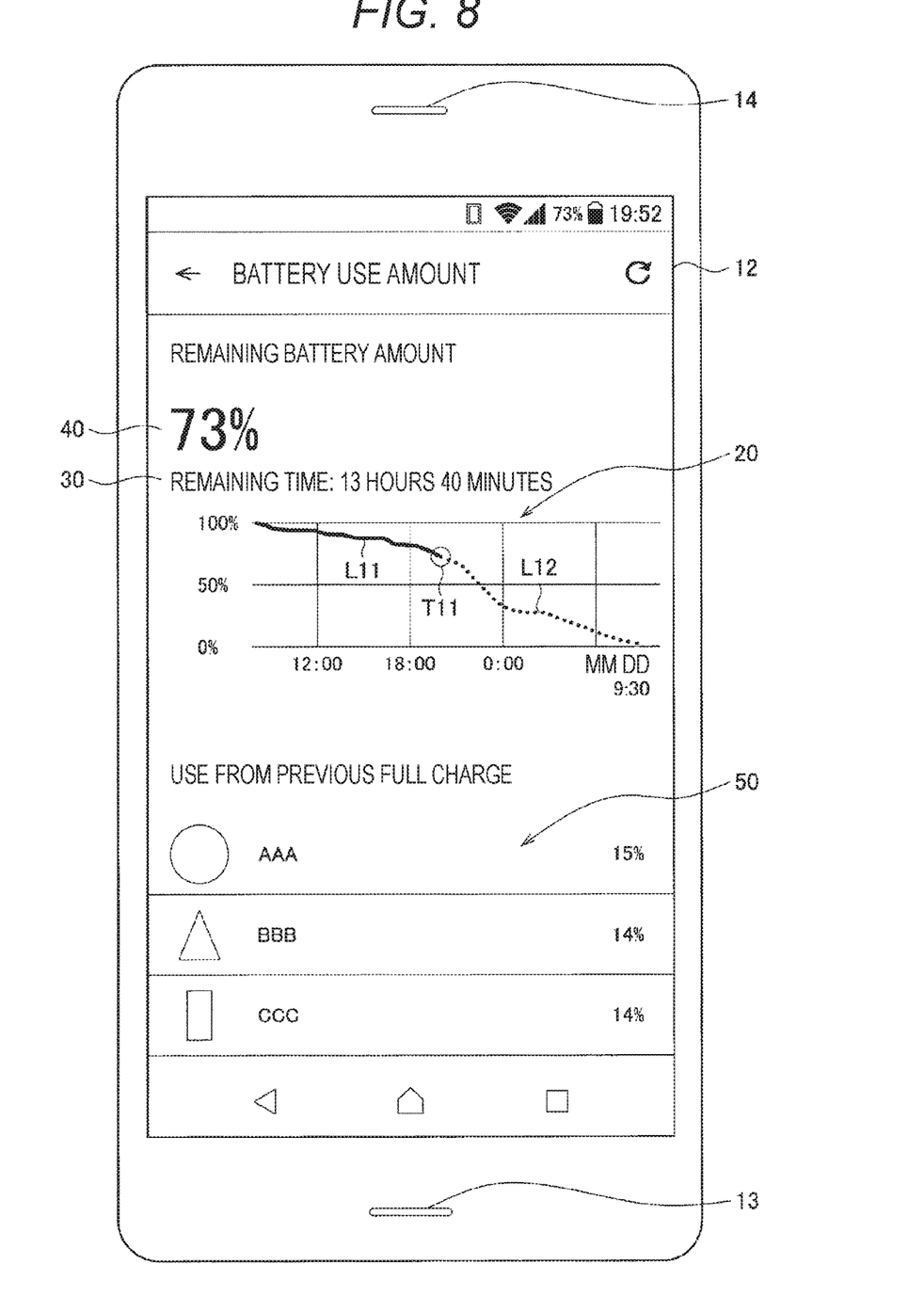
FIG. 8 is an explanatory view illustrating a display example by an information processing apparatus.

In step S15, the control unit 18 generates prediction value related information and presents it to the user. The prediction value related information is information related to a future prediction value of remaining battery amount. An aspect of presentation includes, for example, screen display. In other words, the control unit 18 displays the prediction value related information on the display unit 12. An example is illustrated in FIG. 8. The control unit 18 displays time transition information 20 and remaining time expected information 30 as the prediction value related information. Here, the time transition information 20 is a two-dimensional plane image on which the horizontal axis indicates time point and the vertical axis indicates a remaining battery amount. Then, graphs L11 and L12 and a current time marker T11 are superimposed on the time transition information 20. The graph L11 indicates time transition of the history of remaining battery amount. The graph L12 indicates a time transition of the future prediction value. The current time marker T11 indicates current time point. The remaining time expected information 30 indicates time elapsed from a current point of time to a point of time where the future prediction value becomes zero. Here, the remaining time expected information 30 may indicate time from a current point of time to a point of time where the future prediction value becomes equal to or less than a predetermined value (for example, 5%, 1% of an entire battery capacity). Thus, the user can easily understand how the remaining battery amount has been reduced and moreover how the remaining battery amount would be reduced. Furthermore, the user can easily predict when the remaining battery amount becomes a predetermined value or less (for example, zero). That is, the user can easily predict the future remaining battery amount. As a result, because unnecessary fast charging by the user can be suppressed, the control unit 18 can expect an extension of the lifetime of the battery.

The control unit 18 may output a voice corresponding to the aforementioned prediction value related information from the voice output unit 14. Furthermore, the control unit 18 may present the aforementioned prediction value related information depending on the user's selection operation. In the example of FIG. 8, the control unit 18 present the aforementioned prediction value related information in a case where the user selects an item "battery use amount."

Here, in the example of FIG. 8, the control unit 18 further displays a remaining battery amount image 40 and a battery use rate list 50 indicating the latest remaining battery use amount. Here, the battery use rate list 50 is a list that associates an application operated in the information processing apparatus 10 and a rate of the battery consumption amount consumed by the application with respect to the entire consumption amount. Of course, FIG. 8 is merely one display example. For example, in the example of FIG. 8, the future prediction value is indicated in a graph form, but may be indicated by a numerical value.

In step S20, the control unit 18 calculates a prediction value of the charge start timing on the basis of the use history of the information processing apparatus 10 by the user. Specifically, the control unit 18 specifies a point of time at which charging started first after the point of time of the similar use history specified in step S10. Then, the control unit 18 calculates a period between these points of time. Then, the control unit 18 sets the point of time at which the period elapses from the current time point to a prediction value of the charge start timing. Note that the control unit 18 calculates the period for each similar use history in a case where a plurality of similar use histories is present. Then, the control unit 18 calculates a calculated average value of these periods. Then, the control unit 18 may set the point of time at which the period of the arithmetic mean value elapses from the current time point to a prediction value of the charge start timing.

In step S30, the control unit 18 compares the future prediction value of remaining battery amount with the prediction value of the charge start timing. Then, the control unit 18 determines whether or not the timing at which the future prediction value of remaining battery amount becomes zero is earlier than the prediction value of the charge start timing. In a case where the control unit 18 determines that the timing at which the future prediction value of remaining battery amount becomes zero is earlier than the prediction value of the charge start timing, the step proceeds to step S40. Meanwhile, in a case where the control unit 18 determines that the timing at which the future prediction value of remaining battery amount becomes zero is equal to or later than the prediction value of the charge start timing, the step proceeds to step S50. As described above, in the present embodiment, the control unit 18 compares the timing at which the future prediction value of remaining battery amount becomes zero with the prediction value of the charge start timing. However, the processing performed by the control unit 18 is not limited to this example. For example, the control unit 18 may compare the timing at which the future prediction value of remaining battery amount becomes equal to or less than the predetermined value (for example, 5%, 1% of the entire battery capacity) with the prediction value of the charge start timing. In other words, with the control unit 18, in a case where the control unit 18 determines that the timing at which the future prediction value of remaining battery amount becomes equal to or less than the predetermined value is earlier than the prediction value of the charge start timing, the step proceeds to step S40.

Figure 9:
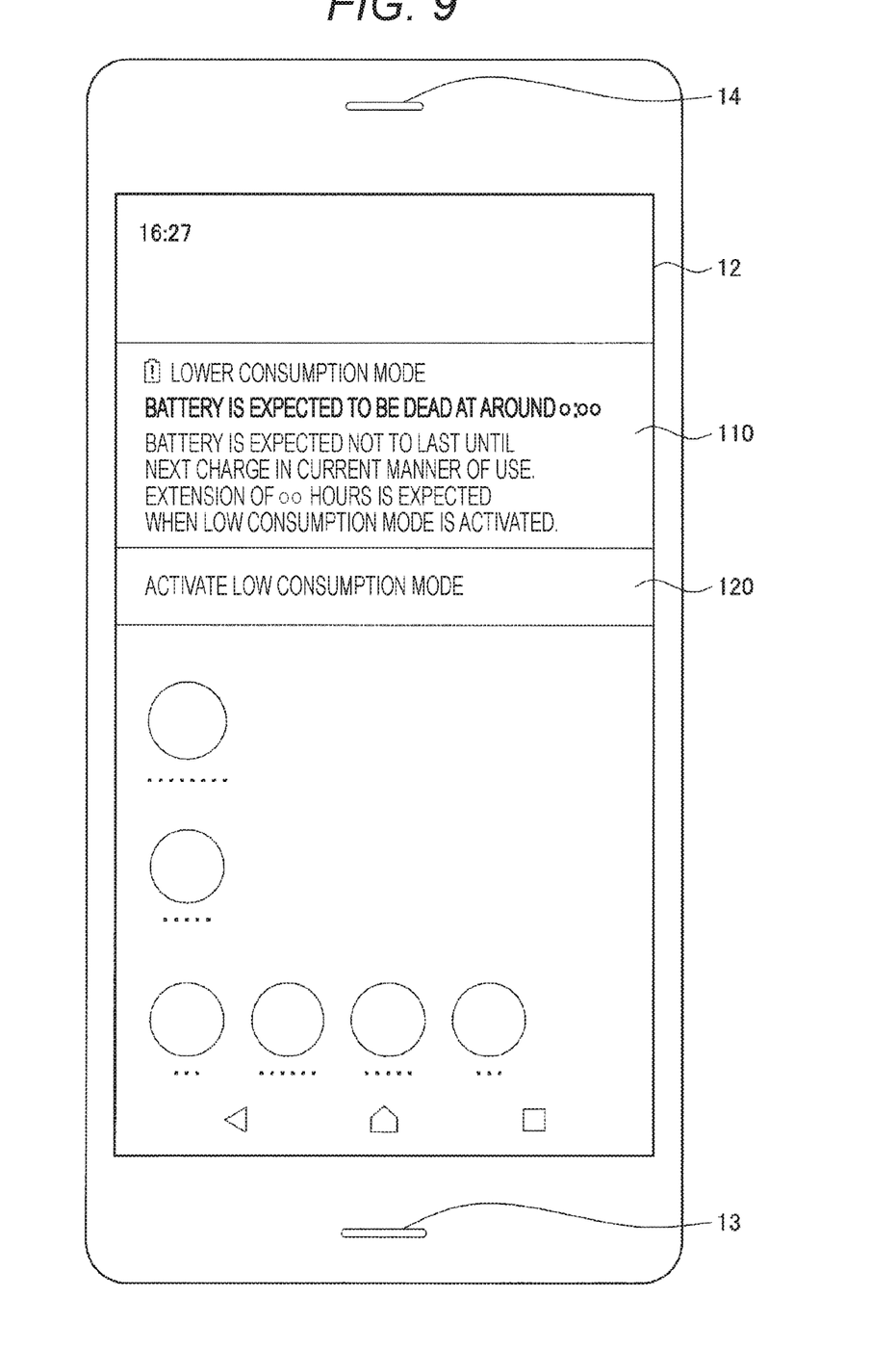
FIG. 9 is an explanatory view illustrating a display example by an information processing apparatus.

In step S40, the control unit 18 generates recommendation information and presents it to the user. Here, the recommendation information is a type of the prediction value related information and is information that recommends a transition to a low power consumption mode. An aspect of presentation includes, for example, screen display. In other words, the control unit 18 displays the recommendation information on the display unit 12. An example is illustrated in FIG. 9. The control unit 18 displays prediction situation explanation information 110 and a low consumption mode on button 120 as the recommendation information. Of course, the recommendation information is not limited to this example. For example, the prediction situation explanation information 110 may be displayed alone as the recommendation information. Furthermore, the control unit 18 may output a voice corresponding to the recommendation information from the voice output unit 14.

The prediction situation explanation information 110 explains the timing at which the future prediction value of remaining battery amount becomes equal to or less than the predetermined value (for example, zero) and explains that the timing at which the future prediction value of remaining battery amount becomes equal to or less than the predetermined value (for example, zero) is earlier than the prediction value of the charge start timing. Moreover, the prediction situation explanation information explains a merit of the low consumption mode. In this example, the prediction situation explanation information 110 explains extension expected time over which the remaining battery amount is extended in the case of the low consumption mode. Note that the extension expected time can be calculated on the basis of the content or the like of the low consumption mode. Furthermore, the type of low consumption mode is not particularly limited. However, the mode of suppressing battery consumption while the use of the information processing apparatus 10 by the user is permitted is preferable. For example, in the low consumption mode, the processing of restricting the function of some applications or the like is performed. The low consumption mode on button 120 is a button to turn on (activate) the low consumption mode. The control unit 18 turns on the low consumption mode in a case where the user taps the low consumption mode on button. Thus, the user can easily understand that the remaining battery amount becomes equal to or less than the predetermined value (for example, zero) if this goes on before charging starts. As a result, the user can take a measure, for example, turning on the low consumption mode according to the recommendation information or quickening the charge start timing.

Accordingly, in a case where the information processing apparatus 10 is used by the user in an aspect of consuming a large remaining battery amount (for example, in a case where a large number of photographs is taken at a resort or the like), the control unit 18 can present the recommendation information to the user regardless of the level of the remaining battery amount. Accordingly, the control unit 18 can urge the user to make a transition to the low consumption mode even if the remaining battery amount is large. Here, the low consumption mode can often be more effective by being activated even when the remaining battery amount is large. As a result, because the user can turn on the low consumption mode more at an earlier stage (i.e., at a stage where the remaining battery amount is large), the low consumption mode can be utilized more effectively.

Here, the control unit 18 may display the aforementioned time transition information 20 together with the recommendation information. Then, the control unit 18 may superimpose an image indicating the prediction value of the charge start timing (for example, an arrow image indicating the charge start timing) on the time transition information 20. Thus, the user can visually understand that the timing at which the future prediction value of remaining battery amount becomes equal to or less than the predetermined value (for example, zero) is earlier than the prediction value of the charge start timing.

Furthermore, the control unit 18 may determine whether or not to present the recommendation information to the user on the basis of the latest use history by the user. More specifically, the control unit 18 may reference the position of the information processing apparatus 10 as the latest use history to determine whether or not to present the recommendation information to the user. For example, in a case where the information processing apparatus 10 (substantially the user) is present at a location (for example, home) or in the vicinity thereof where the information processing apparatus 10 can be charged, the user can start charging early. Accordingly, the control unit 18 may not present the recommendation information in a case where the information processing apparatus 10 is present in such a location. Note that the control unit 18 may record the position information at the time when the battery is in a charged state, as the use history. Then, on the basis of the position information, the control unit 18 may determine whether or not the information processing apparatus 10 (substantially the user) is present at a location (for example, home) or in the vicinity thereof where the information processing apparatus 10 can be charged. Furthermore, the presence or absence of the presentation of the recommendation information may be selected by the user. For example, the control unit 18 may display a check box "Do not display recommendation information" together with the recommendation information (or within a setting screen or the like). Then, the control unit 18 may not present the recommendation information in a case where the check box is checked.

Furthermore, the control unit 18 may display the recommendation information repeatedly or just one time until the user starts charging or the low consumption mode is selected. Furthermore, the control unit 18 may display the time transition information 20 even after the user selects the low consumption mode.

In step S50, the control unit 18 updates the weighting used to search for the similar use history. Thus, the control unit 18 increases the accuracy of similarity judgment. Specifically, the control unit 18 acquires an actual measurement value of remaining battery amount when the time point indicated by the future prediction value is reached. Next, the control unit 18 performs processing of updating the weighting as described below. In other words, the control unit 18 changes the weighting and performs processing similar to step S10. Here, the latest use history and the use history of a searched target are similar to those used in step S10. Thus, the control unit 18 calculates the prediction value of remaining battery amount. Then, the control unit 18 compares the calculated prediction value with the actual measurement value of remaining battery amount. Then, the control unit 18 performs weighting updating processing until a difference between the calculated prediction value and the actual measurement value becomes smaller than a difference between the prediction value calculated in step S10 and the actual measurement value. Thus, the control unit 18 updates the weighting. Thereafter, the control unit 18 ends the processing. Note that, in a case where the charging starts, on the basis of assumption that the discharging state immediately before charging continues until the remaining battery amount become equal to or less than the predetermined value of the remaining battery amount (for example, zero), the control unit 18 may add a time transition of remaining battery amount at this time to the prediction history variable. Thus, the control unit 18 can also learn a discharge aspect the user does not experience in practice.

From the above, according to the present embodiment, the control unit 18 calculates a future prediction value of remaining battery amount on the basis of the use history of the information processing apparatus 10 by the user. Then, the control unit 18 performs control to present the prediction value related information related to the prediction value to the user. Thus, the user can easily predict the future remaining battery amount.

Moreover, the control unit calculates a prediction value of the charge start timing by the user on the basis of the use history of the information processing apparatus 10 by the user. Then, the control unit 18 presents the prediction value related information in a case where the timing at which the future prediction value becomes equal to or less than the predetermined value is earlier than the prediction value of the charge start timing. Thus, the control unit 18 can present the prediction value related information in a case where the necessity of the prediction value related information is large for the user.

Moreover, the control unit 18 performs control to present the recommendation information that recommends a transition to the low power consumption mode to the user, as the prediction value related information. Accordingly, the user can perform a transition to the low consumption mode earlier.

Moreover, the recommendation information includes information indicating that the timing at which the future prediction value becomes equal to or less than the predetermined value is earlier than the prediction value of the charge start timing. Accordingly, the user can easily understand that the remaining battery amount becomes equal to or less than the predetermined value if this goes on before charging starts. As a result, the user can take a measure, for example, turning on the low consumption mode according to the recommendation information or quickening the charge start timing.

Moreover, the control unit 18 determines whether or not to present the recommendation information to the user on the basis of the latest use history of the information processing apparatus 10 by the user. Therefore, the recommendation information can be present to the user in a case where it is estimated that the recommendation information is necessary for the user.

Here, in the aforementioned determination, the latest use history of the information processing apparatus 10 by the user includes the position of the information processing apparatus 10. Accordingly, for example, in a case where the information processing apparatus 10 is present at a location or in the vicinity thereof where the information processing apparatus 10 can be charged, the control unit 18 can be configured not to present the recommendation information. Accordingly, the control unit 18 can present the recommendation information to the user in a case where it is estimated that the recommendation information is necessary for the user.

Moreover, because the control unit 18 performs control to present the time transition of the future prediction value as the prediction value related information, the user can easily understand how the remaining battery amount is reduced. Furthermore, the user can easily predict how when the remaining battery amount becomes a predetermined value or less. That is, the user can easily predict the future remaining battery amount.

Moreover, because the control unit 18 performs control to present the time transition of the past remaining battery amount as the prediction value related information, the user can easily understand how the remaining battery amount has been reduced.

Moreover, the control unit 18 searches for a similar use history similar to the latest use history of the information processing apparatus 10 by the user from the use history of the information processing apparatus 10 by the user. Then, the control unit 18 calculates the future prediction value of remaining battery amount on the basis of the similar use history. Accordingly, the control unit 18 can calculate the future prediction value of remaining battery amount more accurately.

Here, the use history of the information processing apparatus 10 is specified by a plurality of prediction history variables. Then, the control unit 18 performs weighting with respect to each prediction history variable and searches for the similar use history on the basis of the weighted prediction history variable. Accordingly, the control unit 18 can search for the similar use history more accurately and can calculate the future prediction value of remaining battery amount more accurately.

Furthermore, the control unit 18 compares the future prediction value with the actual measurement value of remaining battery amount and updates the weighting of the prediction history variable on the basis of comparison results. Accordingly, the control unit 18 can calculate the future prediction value of remaining battery amount more accurately.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Furthermore, the effects described in the present specification are merely illustrative and demonstrative, and not limitative. That is, the technology according to the present disclosure can exhibit other effects that are evident to those skilled in the art along with or instead of the effects based on the present specification.

Note that, the present disclosure may also be configured as below.

(1)

An information processing apparatus including: a control unit that performs control to calculate a future prediction value of remaining battery amount on the basis of a use history of an information processing apparatus by a user and to present prediction value related information related to the future prediction value to a user.

(2)

The information processing apparatus according to (1), in which the control unit performs control to calculate a prediction value of a charge start timing by the user on the basis of a use history of the information processing apparatus by the user and to present the prediction value related information in a case where a timing at which the future prediction value becomes equal to or less than a predetermined value is earlier than the prediction value of the charge start timing.

(3)

The information processing apparatus according to (2), in which the control unit performs control to present recommendation information that recommends a transition to a low power consumption mode to the user as the prediction value related information.

(4)

The information processing apparatus according to (3), in which the recommendation information includes information indicating that the timing at which the future prediction value becomes equal to or less than the predetermined value is earlier than the prediction value of the charge start timing.

(5)

The information processing apparatus according to (3) or (4), in which the control unit determines whether or not to present the recommendation information to the user on the basis of a latest use history of the information processing apparatus by the user.

(6)

The information processing apparatus according to (5), in which the latest use history of the information processing apparatus by the user includes a position of the information processing apparatus.

(7)

The information processing apparatus according to any one of (1) to (6), in which the control unit performs control to present a time transition of the future prediction value as the prediction value related information.

(8)

The information processing apparatus according to (7), in which the control unit performs control to present a time transition of a past remaining battery amount as the prediction value related information.

(9)

The information processing apparatus according to any one of (1) to (8), in which the control unit searches for a similar use history similar to a latest use history of the information processing apparatus by the user from the use history of the information processing apparatus by the user to calculate the future prediction value on the basis of the similar use history.

(10)

The information processing apparatus according to (9), in which the use history of the information processing apparatus is specified by a plurality of prediction history variables, and
the control unit performs weighting on each of the prediction history variables and searches for the similar use history on the basis of the weighted prediction history variables.

(11)

The information processing apparatus according to (10), in which the control unit compares the future prediction value with an actual measurement value of the remaining battery amount and updates the weighting of the prediction history variables on the basis of a comparison result.

(12)

An information processing method in which a control unit performs control to calculate a future prediction value on the basis of a use history of an information processing apparatus by a user and to present prediction value related information related to the future prediction value to the user.

(13)

A program causing a computer to achieve a control function that performs control to calculate a future prediction value on the basis of a use history of an information processing apparatus by a user and present prediction value related information related to the future prediction value to the user.

REFERENCE SIGNS LIST

10 Information processing apparatus
11 Communication unit

12 Display unit
13 Voice input unit
14 Voice output unit
15 Input operation unit
16 Battery unit
17 Storage unit
18 Control unit

The invention claimed is:

1. An information processing apparatus comprising:
circuitry configured to perform control to calculate a future prediction value of remaining battery percentage on a basis of a use history of an information processing apparatus by a user and to present prediction value related information related to the future prediction value and the future prediction value of the remaining battery percentage to the user.

2. The information processing apparatus according to claim 1, wherein the circuitry performs control to calculate a prediction value of a charge start timing by the user on a basis of a use history of the information processing apparatus by the user and to present the prediction value related information in a case where a timing at which the future prediction value becomes equal to or less than a predetermined value is earlier than the prediction value of the charge start timing.

3. The information processing apparatus according to claim 2, wherein the circuitry performs control to present recommendation information that recommends a transition to a low power consumption mode to the user as the prediction value related information.

4. The information processing apparatus according to claim 3, wherein the recommendation information includes information indicating that the timing at which the future prediction value becomes equal to or less than the predetermined value is earlier than the prediction value of the charge start timing.

5. The information processing apparatus according to claim 3, wherein the circuitry determines whether or not to present the recommendation information to the user on a basis of a latest use history of the information processing apparatus by the user.

6. The information processing apparatus according to claim 5, wherein the latest use history of the information processing apparatus by the user includes a position of the information processing apparatus.

7. The information processing apparatus according to claim 1, wherein the circuitry performs control to present a time transition of the future prediction value as the prediction value related information.

8. The information processing apparatus according to claim 7, wherein the circuitry performs control to present a time transition of a past remaining battery percentage as the prediction value related information.

9. The information processing apparatus according to claim 1, wherein the circuitry searches for a similar use history similar to a latest use history of the information processing apparatus by the user from a use history of the information processing apparatus by the user to calculate the future prediction value on a basis of the similar use history.

10. The information processing apparatus according to claim 9, wherein the use history of the information processing apparatus is specified by a plurality of prediction history variables, and
the circuitry performs weighting with respect to each of the prediction history variables and searches for the similar use history on a basis of the weighted prediction history variables.

11. The information processing apparatus according to claim 10, wherein the circuitry compares the future prediction value with an actual measurement value of the remaining battery percentage and updates the weighting of the prediction history variables on a basis of a comparison result.

12. The information processing apparatus according to claim 1, wherein the prediction value related information related to the future prediction value includes hours and minutes of remaining battery time.

13. The information processing apparatus according to claim 12, wherein the prediction value related information related to the future prediction value includes time transition information that is a two-dimensional plane image on which the horizontal axis indicates time and the vertical axis indicates a remaining battery amount.

14. An information processing method, comprising:
performing control, by circuitry, to calculate a future prediction value of remaining battery percentage on a basis of a use history of an information processing apparatus by a user and to present prediction value related information related to the future prediction value and the future prediction value of the remaining battery percentage to the user.

15. The information processing method according to claim 14, wherein the prediction value related information related to the future prediction value includes hours and minutes of remaining battery time.

16. The information processing method according to claim 15, wherein the prediction value related information related to the future prediction value includes time transition information that is a two-dimensional plane image on which the horizontal axis indicates time and the vertical axis indicates a remaining battery amount.

17. A non-transitory computer-readable storage medium storing instructions thereon which, when executed by circuitry, cause the instructions to perform a method, the method comprising:
performing control to calculate a future prediction value of remaining batters, percentage on a basis of a use history of an information processing apparatus by a user and to present prediction value related information related to the future prediction value and the future prediction value of the remaining battery percentage to the user.

18. The non-transitory computer-readable storage medium according to claim 17, wherein the prediction value related information related to the future prediction value includes hours and minutes of remaining battery time.

19. The non-transitory computer-readable storage medium according to claim 18, wherein the prediction value related information related to the future prediction value includes time transition information that is a two-dimensional plane image on which the horizontal axis indicates time and the vertical axis indicates a remaining battery amount.

* * * * *